May 26, 1970 O. JESPERSEN 3,514,539

PORTABLE SOUND SYSTEM

Filed Feb. 28, 1967 2 Sheets-Sheet 1

INVENTOR
OLIVER JESPERSEN

BY James M. Heilman
ATTORNEY.

PORTABLE SOUND SYSTEM

Filed Feb. 28, 1967 2 Sheets-Sheet 2

INVENTOR
OLIVER JESPERSEN

BY James J. Heilman
ATTORNEY.

United States Patent Office 3,514,539
Patented May 26, 1970

3,514,539

PORTABLE SOUND SYSTEM

Oliver Jespersen, 1282 Summit Ave., Westfield, N.J. 07092

Filed Feb. 28, 1967, Ser. No. 619,394
Int. Cl. H04r *1/02*
U.S. Cl. 179—1 7 Claims

ABSTRACT OF THE DISCLOSURE

This invention is an improvement in a portable sound system wherein the amplifying chassis is permanently secured and connected to a speaker, and is carried within the speaker cabinet when inoperative, but is raised electrically or mechanically when in operation.

This invention is an improvement on my prior invention, U.S. Pat. 3,183,305, granted May 11, 1965, entitled "Portable Sound System." Among other new features is the permanent electrical connection between the amplifier chassis and the speaker, and the raising and lowering of the chassis into the speaker cabinet by electrical or mechanical means.

Another object of the invention is to provide a sound system that may be transported in one piece, using a reflex enclosure, and a chassis that is permanently connected to the speaker enclosure and elevates from the enclosure. This operation puts the amplifier chassis in a well ventilated position during use and makes use of the total area of the speaker enclosure for better acoustical purposes, and uses part of the same area to contain the amplifier while it is being transported thereby minimizing the size and improving its portability.

A further feature of the invention is to use an air seal to complete the closure at the upper extreme of the amplifier carriage travel, and to eliminate connections for the user to complete between the amplifier and speaker since this wiring is internal and is permanently connected. Other features are readily apparent from the following specification and claims.

Figures 1, 2:
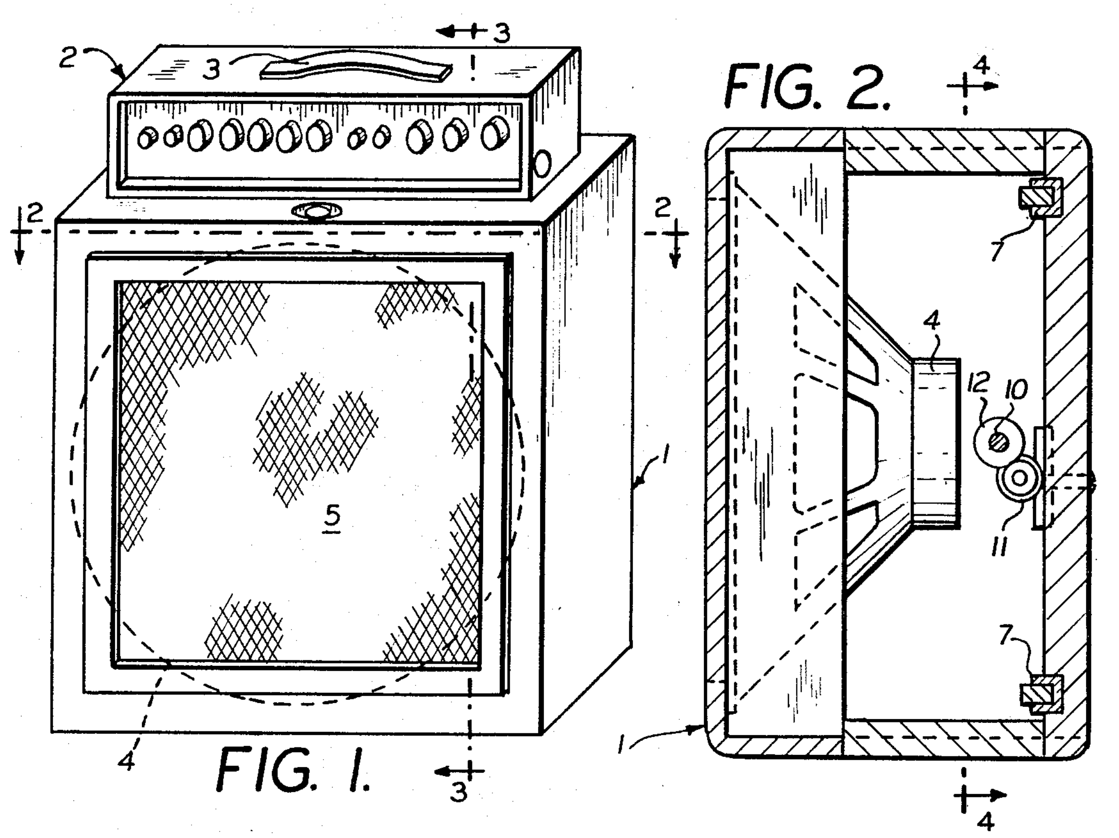
FIG. 1 is a perspective view of my loudspeaker and amplifier in raised or operative position.
FIG. 2 is a cross-sectional view taken on the line 2—2 of FIG. 1.

This invention relates to an improvement with respect to the portability of a permanently connected system. Most other products of this nature consist of a two piece system, i.e., an amplifier chassis which is contained in one housing, and the loudspeaker which is contained in another housing. The one exception to this is the device disclosed in my above Pat 3,183,305, which uses an invertible top closure. On one side of this closure the chassis is affixed while on the other side the carrying handle is fastened. The lower powered units are very often put into a single housing thereby causing the unit to be larger, or eliminating the possibility of using the reflex cabinet that this invention incorporates.

In all the prior art, including the above prior patent, where the amplifier chassis comes apart from the speaker housing, it is necesary for the musician to make the electrical connection to the loudspeaker.

Referring to the drawings in detail, numeral 1 indicates the speaker cabinet; 2 the amplifying chassis having a carrying handle 3 secured to the top. Numeral 4 indicates a loudspeaker, and 5 the grill.

In normal carrying position the amplifier 2 is carried within the speaker cabinet 1, but in order to provide a reflex effect and improve the acoustics in the operative position the amplifier is raised to project above the cabinet and to seal the cabinet by gaskets or air seals 31. In addition to the reflex effect, ventilation or heat dissipation is provided for the amplifying unit, while the speaker cabinet is completely sealed at the opening provided for the amplifier carriage for better acoustical effects.

The chassis is provided with side brackets 6 which slide in rails 7 secured to the rear of the cabinet. A cross-bar 8 connects the chassis brackets, at the center of which is a threaded bushing 9 through which the elongated screw 10 operates to raise and lower the cross-bar and hence the amplifier.

Figure 3:
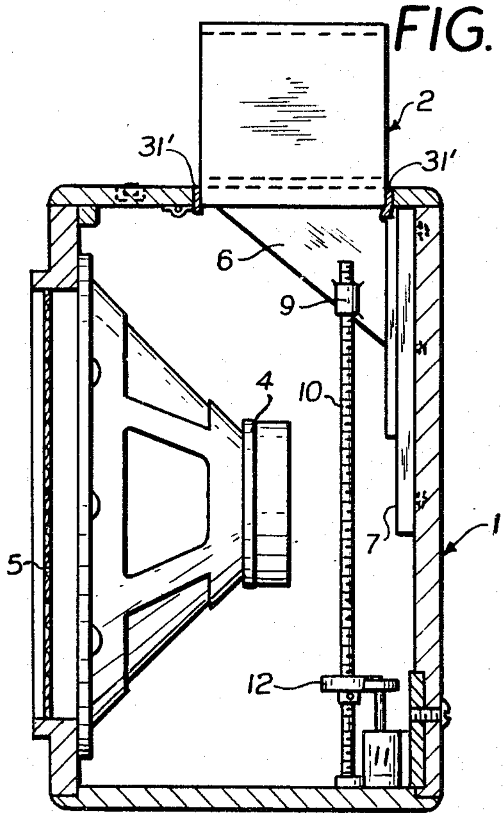
FIG. 3 is a cross-sectional view taken on the line 3—3 of FIG. 1.

At the bottom and rear of the cabinet is positioned a conventional AC or 12-volt DC motor 11 operating through a conventional transformer to actuate the reduction gearing and drive wheel 12. As the motor shaft and drive wheel turn, they rotate elongated screw 10 to cause bushing 9 and the amplifier to retract into the cabinet or to move above the cabinet as shown in FIG. 3. A retractible reel 13, preferably spring actuated is provided for power line 14 housed wholly within the cabinet, and to provide a source of power for motor 11 as well as amplifier 2 through interior electrical wires 15 which are connected to the amplifier through a safety interlock switch 16.

The main switch for raising and lowering the amplifier is shown at 17, and the electrical connections, which are conventional are not shown. If desired, limit switches 18 and 19 may be used so that the current will be turned off when the amplifier reaches its maximum positions.

Figure 5:
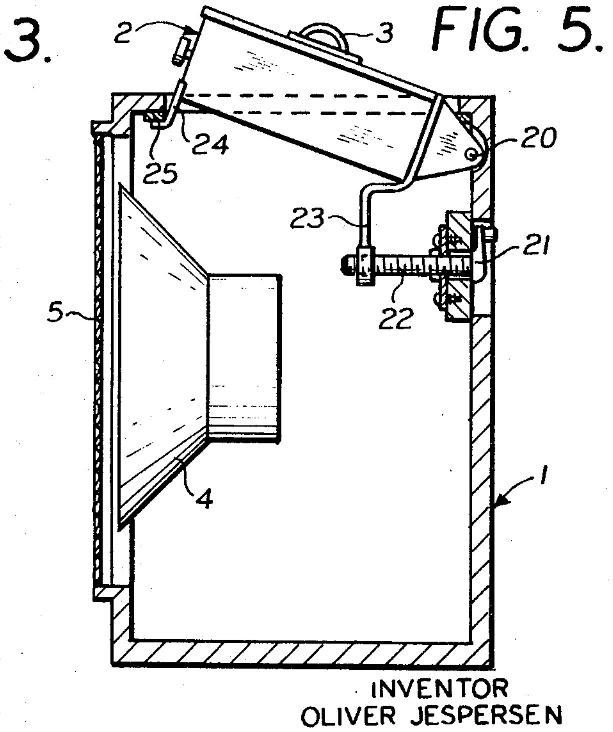
FIG. 5 is a modified version illustrating a hand-operated crank.

Referring to FIG. 5 specifically, this is a simplified version. The amplifier 2 is hinged to the cabinet by pivot 20. Hence, when it is desired to raise the chassis, crank 21 is turned which operates screw 22 to force lug 23 outwardly and raise the chassis so that the sealing continuous ledge or flange 24 attached to the chassis will form a tight seal with gasket 25.

Figures 6, 8:
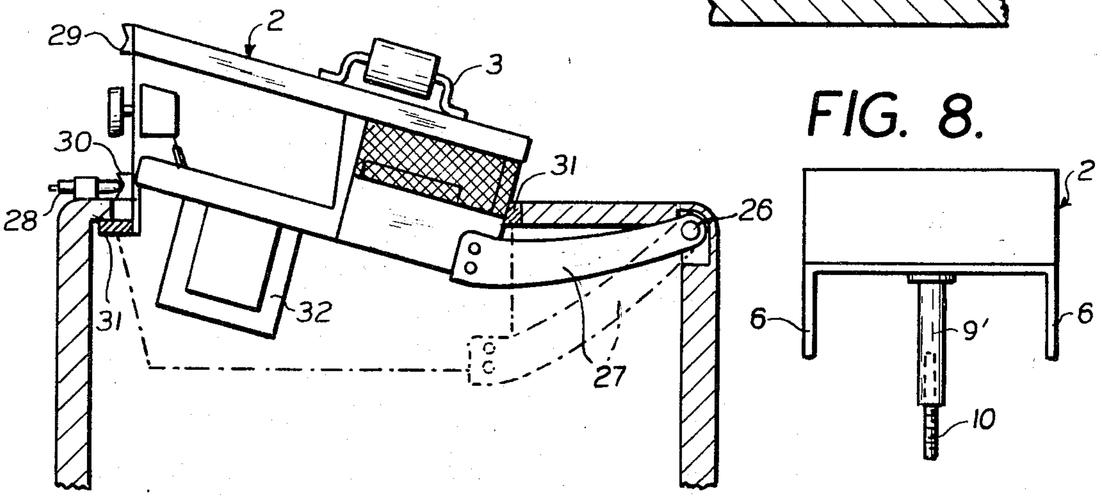
FIG. 6 is a further modified version.
FIG. 8 is a partial front view of FIG. 7 on line 8—8 of FIG. 7.

FIG. 6 is another modified version, in which the chassis is attached to the cabinet through hinge 26 and pivotable arm 27. A bolt fastening means 28 by means of pockets 29 or 30 will latch the chassis in either open or closed position. In operative position a tight reflex cabinet will be formed by means of gaskets or air seals 31 between the chassis and the top of the cabinet. Numeral 32 illustrates a conventional transformer connected to the chassis.

Figure 4:
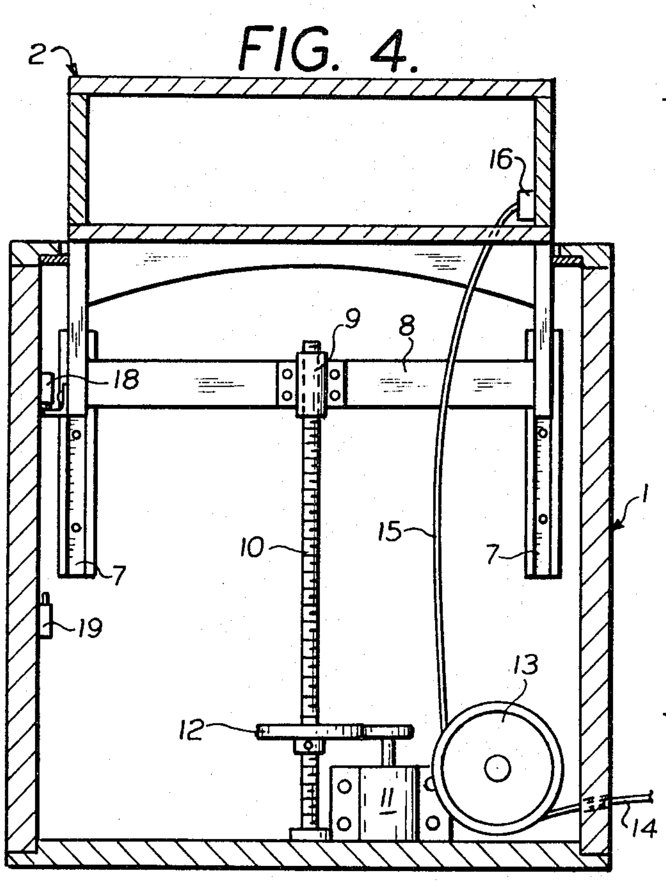
FIG. 4 is a view taken on the line 4—4 of FIG. 2 but with the motor and reduction gears eliminated.
Figure 7:
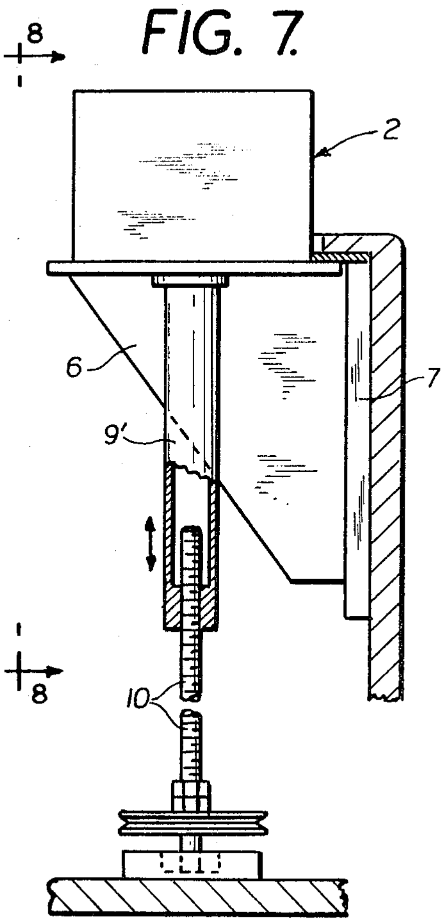
FIG. 7 is a modified form similar to FIG. 4 but with the bearing replaced by a threaded pipe.

In the modified version illustrated in FIGS. 7 and 8, the cross-bar and bearing of FIG. 4 are replaced by an internally threaded sleeve 9' which is securely fastened to the bottom of the amplifier. Hence, when the screw threaded rod 10 rotates, the sleeve or pipe will be forced to rise out of the speaker cabinet and carry the amplifier with it. If desired, a pivot may be provided at the rear of the chassis and cabinet, and a limited front to back swing provided in the sleeve-amplifier connection so that when the amplifier rises out of the cabinet the front surface and control dial will be tilted upwardly through approximately a 45° angle.

It is therefore seen that I have invented a very attractive and practical sound system assembly which is almost foolproof in its operation, and attractive and practical in its construction.

The embodiments of the invention in which exclusive property or privilege is claimed are defined as follows:

1. A portable sound system comprising a speaker cabinet, a loudspeaker, an amplifier chasssis permanently connected to said cabinet, a source of electrical power connecting said chassis to said loudspeaker within said cabinet, and means to raise said chassis automatically from a traveling position within said cabinet to an operative, ventilated position outside said cabinet whereby the inside of said cabinet is sealed to produce a reflex enclosure for the loudspeaker, and wherein said electrical power is also connected to said means for raising and lowering said chassis, and wherein the top of the cabinet has a cutout section, said cutout section forming the base of the chassis, and a handle secured to the upper side of the base of the chassis for carrying the assembly when the chassis is retracted and poitioned in the cabinet, and wherein a gasket is secured around the opening left by the cutout section, and said chassis engaging and compressing said gasket to form an acoustical chamber within said cabinet, and wherein the chassis is provided with brackets on each side thereof, and said means for raising and lowering said chassis comprises a motor connected to said electrical power, a rotatable threaded screw operatively connected to said motor which actuates said screw, non-rotatable cylindrical means internally threaded to engage with the threaded screw and to advance and to retreat on said screw, said cylindrical means secured to said amplifier to raise and lower the same.

2. A system as set forth in claim 1 wherein a control switch in said cabinet is provided, and an upper and a lower limiting stop switch is placed in said cabinet so that damage to the elevating mechanism will be prevented.

3. A system as set forth in claim 2 wherein a spring actuated winding reel for storing said electrical power means is positioned within said cabinet, a shaft, and a driving gear connected to said motor, said rotatable screw and said cylindrical member both being elongated and positioned vertically and extending throughout a substantial height of the cabinet, said motor, shaft and driving gear serving to rotate said elongated elevating screw to raise and lower said chassis.

4. A system as set forth in claim 1 wherein a safety interlock switch is incorporated in the electrical circuit, and slides are provided on a wall of said cabinet to guide said brackets.

5. A portable sound system comprising a speaker cabinet, a loudspeaker, an amplifier chasssis permanently connected to said cabinet, a source of electrical power connecting said chassis to said loudspeaker within said cabinet, and means to raise said chassis automatically from a traveling position within said cabinet to an operative, ventilated position outside said cabinet, whereby the inside of said cabinet is sealed to produce a reflex enclosure for the loudspeaker, and wherein said electrical power is also connected to said means for raising and lowering said chassis, and wherein the top of the cabinet has a cutout section, said cutout section forming the base of the chassis, and a handle secured to the upper side of the base of the chassis for carrying the assembly when the chassis is retracted and positioned in the cabinet, and wherein a gasket is secured around the opening left by the cutout section and said chassis engaging and compressing said gasket to form an acoustical chamber within said cabinet, and wherein the chassis is provided with brackets on each side thereof, and said means for raising and lowering said chassis comprises a cross-bar connecting said brackets, a screw-threaded cylindrical element secured to said cross-bar, and elevating means comprising a rotatable screw meshing with said cylindrical element to raise and lower said chassis.

6. A portable sound system comprising a speaker cabinet, a loudspeaker, an amplifier chasssis permanently connected to said cabinet, a source of electrical power connecting said chassis to said loudspeaker within said cabinet, and means to raise said chassis automatically from a traveling position within said cabinet to an operative, ventilated position outside said cabinet whereby the inside of said cabinet is sealed to produce a reflex enclosure for the loudspeaker, and wherein a pivot connects one end of said chassis to said cabinet, a catch on the upper and lower sides of said chassis, a plunger on said cabinet, said plunger engageable in said catches to hold said chassis in either elevated or in depressed condition.

7. A portable sound system comprising a speaker cabinet, a loudspeaker, an amplifier chassis permanently connected to said cabinet, a source of electrical power connecting said chassis to said loudspeaker within said cabinet and means to raise said chassis automatically from a traveling position within said cabinet to an operative, ventilated position outside said cabinet whereby the inside of said cabinet is sealed to produce a reflex enclosure for the loudspeaker, and wherein said means to raise said chassis comprises a pivot pin connecting said chassis to said cabinet, a depending lug connected to said chassis, a screw threaded into said lug, and a crank on the other end of said screw whereby when the crank is turned the dependent lug will move and the forward position of the chassis will be raised out of said cabinet at the same time sealing the inside of the cabinet.

References Cited

UNITED STATES PATENTS 3,183,305 5/1965 Jespersen.

KATHLEEN H. CLAFFY, Primary Examiner

C. W. JIRAUCH, Assistant Examiner